(12) United States Patent
Sharma et al.

(10) Patent No.: US 9,390,255 B2
(45) Date of Patent: Jul. 12, 2016

(54) PRIVILEGED ACCOUNT MANAGER, DYNAMIC POLICY ENGINE

(75) Inventors: Himanshu Sharma, Berkeley, CA (US); Buddhika Kottahachchi, San Mateo, CA (US); Arun Theebaprakasam, Burlingame, CA (US); Kuang-Yu Shih, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 780 days.

(21) Appl. No.: 13/485,408

(22) Filed: May 31, 2012

(65) Prior Publication Data

US 2013/0086065 A1    Apr. 4, 2013

Related U.S. Application Data

(60) Provisional application No. 61/540,984, filed on Sep. 29, 2011.

(51) Int. Cl.
| | |
|---|---|
| *G06F 7/00* | (2006.01) |
| *G06F 17/30* | (2006.01) |
| *G06F 21/45* | (2013.01) |
| *G06F 21/31* | (2013.01) |

(Continued)

(52) U.S. Cl.
CPC .............. *G06F 21/45* (2013.01); *G06F 21/31* (2013.01); *G06F 21/316* (2013.01); *G06F 21/46* (2013.01); *G06F 21/55* (2013.01); *G06F 21/554* (2013.01); *G06F 21/604* (2013.01); *H04L 63/083* (2013.01); *H04L 63/10* (2013.01); *G06F 2221/2111* (2013.01)

(58) Field of Classification Search
CPC .................. G06F 17/30289; G06F 17/30864; G06F 17/30997
USPC .......................... 707/736, 737, 754, 784, 785
See application file for complete search history.

(56) References Cited

U.S. PATENT DOCUMENTS 6,141,778 A * 10/2000 Kane ..................... G06F 21/604
                                                                  726/4
6,516,416 B2   2/2003 Gregg et al.

(Continued)

OTHER PUBLICATIONS

U.S. Appl. No. 13/485,372 , "Final Office Action", Sep. 9, 2013, 16 pages.

(Continued)

*Primary Examiner* — Md. I Uddin
(74) *Attorney, Agent, or Firm* — Kilpatrick Townsend & Stockton LLP

(57) ABSTRACT

Techniques for managing accounts are provided. An access management system may check out credentials for accessing target systems. For example a user may receive a password for a period of time or until checked back in. Access to the target system may be logged during this time. Upon the password being checked in, a security account may modify the password so that the user may not log back in without checking out a new password. Additionally, in some examples, password policies for the security account may be managed. As such, when a password policy changes, the security account password may be dynamically updated. Additionally, in some examples, hierarchical viewing perspectives may be determined and/or selected for visualizing one or more managed accounts. Further, accounts may be organized into groups based on roles, and grants for the accounts may be dynamically updated as changes occur or new accounts are managed.

14 Claims, 10 Drawing Sheets

(51) Int. Cl.
  *H04L 29/06*  (2006.01)
  *G06F 21/55* (2013.01)
  *G06F 21/46* (2013.01)
  *G06F 21/60* (2013.01)

(56) References Cited

U.S. PATENT DOCUMENTS

| | | | |
|---|---|---|---|
| 6,754,702 | B1 | 6/2004 | Kennelly et al. |
| 7,073,129 | B1 | 7/2006 | Robarts et al. |
| 7,290,288 | B2 | 10/2007 | Gregg et al. |
| 7,581,245 | B2 | 8/2009 | Rojewski |
| 8,266,682 | B2 | 9/2012 | Lee |
| 9,069,947 | B2 | 6/2015 | Kottahachchi et al. |
| 2002/0095395 | A1 | 7/2002 | Larson et al. |
| 2003/0056026 | A1 | 3/2003 | Anuff et al. |
| 2003/0101360 | A1 | 5/2003 | Legros et al. |
| 2004/0064742 | A1 | 4/2004 | Excoffier et al. |
| 2004/0133876 | A1* | 7/2004 | Sproule ............... G06Q 10/063 717/105 |
| 2004/0215610 | A1 | 10/2004 | Dixon et al. |
| 2007/0055602 | A1 | 3/2007 | Mohn |
| 2007/0282942 | A1 | 12/2007 | Bailey et al. |
| 2008/0027788 | A1 | 1/2008 | Lawrence et al. |
| 2008/0059804 | A1 | 3/2008 | Shah et al. |
| 2008/0250332 | A1 | 10/2008 | Farrell et al. |
| 2008/0275851 | A1 | 11/2008 | Taylor et al. |
| 2009/0144183 | A1 | 6/2009 | Gatchell et al. |
| 2009/0240728 | A1 | 9/2009 | Shukla et al. |
| 2010/0145718 | A1 | 6/2010 | Elmore et al. |
| 2010/0325687 | A1 | 12/2010 | Iverson et al. |
| 2010/0325705 | A1 | 12/2010 | Iverson et al. |
| 2010/0325707 | A1 | 12/2010 | Iverson et al. |
| 2011/0023107 | A1 | 1/2011 | Chen et al. |
| 2011/0040793 | A1 | 2/2011 | Davidson et al. |
| 2011/0053555 | A1 | 3/2011 | Cai et al. |
| 2011/0083163 | A1 | 4/2011 | Auvenshine et al. |
| 2011/0106835 | A1 | 5/2011 | Lauridsen et al. |
| 2011/0112939 | A1 | 5/2011 | Nelson et al. |
| 2011/0154464 | A1 | 6/2011 | Agarwal et al. |
| 2011/0213789 | A1 | 9/2011 | Doshi et al. |
| 2011/0247059 | A1 | 10/2011 | Anderson et al. |
| 2011/0265160 | A1 | 10/2011 | Nettleton |
| 2011/0296001 | A1 | 12/2011 | Ramstrom |
| 2012/0023546 | A1 | 1/2012 | Kartha et al. |
| 2013/0086060 | A1 | 4/2013 | Donley et al. |
| 2013/0086628 | A1 | 4/2013 | Kottahachchi et al. |
| 2013/0086658 | A1 | 4/2013 | Kottahachchi et al. |

OTHER PUBLICATIONS

U.S. Appl. No. 13/485,327, "Final Office action", Oct. 22, 2014, 16 Pages.
U.S. Appl. No. 13/485,372, "Final Office Action", mailed Jan. 21, 2015, 20 pages.
U.S. Appl. No. 13/485,327, "Notice of Allowance", mailed Apr. 15, 2015, 11 pages.
U.S. Appl. No. 13/485,372, Non-Final Office Action mailed on Feb. 28, 2013, 14 pages.
U.S. Appl. No. 13/485,255, "Notice of Allowance", mailed Jun. 5, 2015, 10 pages.
U.S. Appl. No. 13/485,372, "Notice of Allowance", mailed May 4, 2015, 10 pages.
U.S. Appl. No. 13/485,255, "Final Office Action", Aug. 25, 2014, 20 pages.
U.S. Appl. No. 13/485,372, "Non Final Office Action", Jul. 2, 2014, 15 pages.
U.S. Appl. No. 13/485,255, "Non Final Office Action", Dec. 19, 2013, 26 pages.
U.S. Appl. No. 13/485,327, "Non-Final Office Action", Feb. 4, 2014, 22 pages.
"Register" and "Mapping", definitions in *Webster's Third New International Dictionary*, Merriam-Webster Inc., 2001, 3 pages.
"User", definition in *Dictionary of Information Security*, Syngress Publishing Inc., 2006, 2 pages.

* cited by examiner

PRIVILEGED ACCOUNT MANAGER, DYNAMIC POLICY ENGINE

CROSS REFERENCES TO RELATED APPLICATIONS

The present application is a non-provisional of and claims the benefit and priority under 35 U.S.C. 119(e) of U.S. Provisional Application No. 61/540,984 filed Sep. 29, 2011 entitled "PRIVILEGED ACCOUNT MANAGER", the entire contents of which are incorporated herein by reference for all purposes. This application is also related to application Ser. No. 13/485,327, filed on the same day herewith, entitled "PRIVILEGED ACCOUNT MANAGER, ACCESS MANAGEMENT," application Ser. No. 13/485,255, filed on the same day herewith, entitled "PRIVILEGED ACCOUNT MANAGER, APPLICATION ACCOUNT MANAGEMENT," and application Ser. No. 13/485,372, filed on the same day herewith, entitled "PRIVILEGED ACCOUNT MANAGER, MANAGED ACCOUNT PERSPECTIVES," the entire contents of each is hereby incorporated by reference as if fully set forth herein, under 35 U.S.C. §120.

BACKGROUND

Modern computing systems often utilize multiple privileged accounts for providing secure access to computing resources. Additionally, multiple different types of privileged accounts may be implemented by a single system to provide different roles and/or levels of access. For example, a user account may be provided different rights from an administrative account. With a wide variety of account types and/or roles, it can become burdensome to manage credentials and/or security for the multitude of accounts. Additionally, visualizing and/or displaying such accounts in a meaningful manner may become constrained. As such, finding improved ways to manage privileged accounts continues to be a priority.

BRIEF SUMMARY

Techniques for managing privileged accounts are provided. In some examples, an access management system may be provided to check out log-in credentials to users for accessing a target system. For example, a user may receive a password for accessing the target system for a period of time or until checked back in. Access to the target system may be logged during this time. In some examples, upon the password being checked back in, a security account may be provided that is configured to modify the password so that the user may not be able to log back in without checking out a new password. Additionally, in some examples, password policies for the security account may be managed. As such, when a password policy changes, the target system and/or an application wallet configured to store the security account password may be dynamically updated. Additionally, in some examples, hierarchical viewing perspectives may be determined and/or selected for visualizing one or more privileged accounts being managed. Further, privileged accounts may be organized into groups based at least in part on roles and, as such, grants for the managed accounts may be dynamically updated as changes occur or new accounts come under management.

According to at least one example, a system may include memory and processors configured to access the memory. The processors may also be configured to execute instructions to receive information associated with multiple accounts associated with a target system. In some aspects, the multiple accounts may be configured for accessing resources used by the associated target system. Additionally, the processors may also be configured to execute the instructions to organize one or more of the multiple accounts together in a group and assign a grant to the group. The group may be based at least in part on a role for each of the one or more accounts.

In some aspects, different accounts may be of different types including, but not limited to, a user account type, a root account type, an administrative account type, and/or a user-defined account type. Additionally, different accounts may be associated with different target systems and/or different types of target systems. In some examples, the received information associated with the multiple accounts of the target system may indicate a particular target system associated with the account, a type of the account, or a role associated with the account.

In some examples, the processors may be further configured to execute the instructions to receive grant information for the group. The assignment of the grant to the group may be based at least in part on the received grant information, some examples. The processors may also be configured to execute the instructions to receive information associated with a new account associated with the target system and to add the new account to the group based at least in part on information indicating that a role of the new account matches a role of the group. Further, the processors may be configured to execute the instructions to update the grant of each account in the group.

According to at least on example, a first system may include memory and processors configured to access the memory. The processors may also be configured to execute instructions to receive identification of a user-accessible account of a target system to be managed. The identification of the user-accessible account may be received from the target system. Additionally, the processors may also be configured to associate the user-accessible account with a security account of the target system. In some aspects, the security account may be configured to modify a password associated with the user-accessible account.

In some examples, the security account may not be accessible by a user of the target system. Additionally, the security account may only be accessible by the first system. Further, the target system may be configured with multiple user-accessible accounts. In some cases, the processors may also be configured to execute instructions to associate a predetermined number of the multiple user-accessible accounts with the security account. The predetermined number of user-accessible accounts may be configurable by the target system.

In some examples, the processors may also be configured to execute the instructions to receive a request for a password. The request may be received from a user of the target system. Additionally, the password may provide the user with access to the user-accessible account of the target system. The processors may further be configured to execute the instructions to provide the password to the user. In some cases, the password may be provided to the user only when the user has been successfully authenticated by the first system. The processors may also be configured to execute the instructions to log an indication that the user has checked out the password. Further, the processors may be configured to execute the instructions to automatically modify the password of the user-accessible account in response to the user checking the password back in to the first system.

Further, in some aspects, the processors may be configured to execute the instructions to receive a user grant associated with access rights of the user-accessible account and to administer the user grant by managing a password for providing the user with access to the user-accessible account of the target system. The user grant may be received from the target system, in some examples. The user grant may also indicate a day, a time, a duration, and/or a location during which the system will provide the password to the user.

According to at least one example, a system may include memory and processors configured to access the memory. The processors may also be configured to execute instructions to receive information associated with an account used by a first application to access a target system. The account may, in some examples, be used for accessing resources used by the target system. Additionally, the processors may also be configured to execute the instructions to manage a feature of the account used by the first application. In some aspects, the first application is not a user.

In some examples, the processors may also be configured to execute the instructions to register the account used by the first application with the system based at least in part on the received information associated with the account used by the first application. The information associated with the account used by the first application may include an account identifier, an identifier of the target system, and/or mapping information for application wallet associated with the first application. In some aspects, the target system may be a database and/or a server. The feature of the account used by the first application may be a password policy, in some examples. Further, the password policy may be a password construction rule and/or a password lifecycle rule.

According to at least one example, an account management system may include memory and processors configured to access the memory. The processors may also be configured to execute instructions to receive identification of multiple accounts of a target system. The identification may be received from an administrator account, in some examples. In some aspects, at least one of the multiple accounts may be managed by the account management system. The processors may also be configured to execute the instructions to prepare at least one of the multiple accounts in a user-configurable hierarchical view. In some aspects the preparation of the hierarchical view may be for display to a user account.

In some examples, the administrator account may be associated with the account management system and may act on behalf of the target system. The account may also be associated with an application for accessing the target system. Additionally, the processors may also be configured to execute the instructions to receive an attribute/value pair for at least one of the multiple accounts. The attribute/pair value may be received from the administrator account, in one example. In some aspects, the attribute may be geographic, functional, domain-based, and/or user-defined. Additionally, the value may be a location, an account function, a domain name, and/or a user-defined value associated with one of the multiple accounts. Further, the processors may also be configured to execute the instructions to receive a perspective selection for viewing the multiple accounts. The perspective selection may be received from the user account. The accounts may be viewed based at least in part on the attribute/value pair and/or the selected perspective.

The foregoing, together with other features and embodiments will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
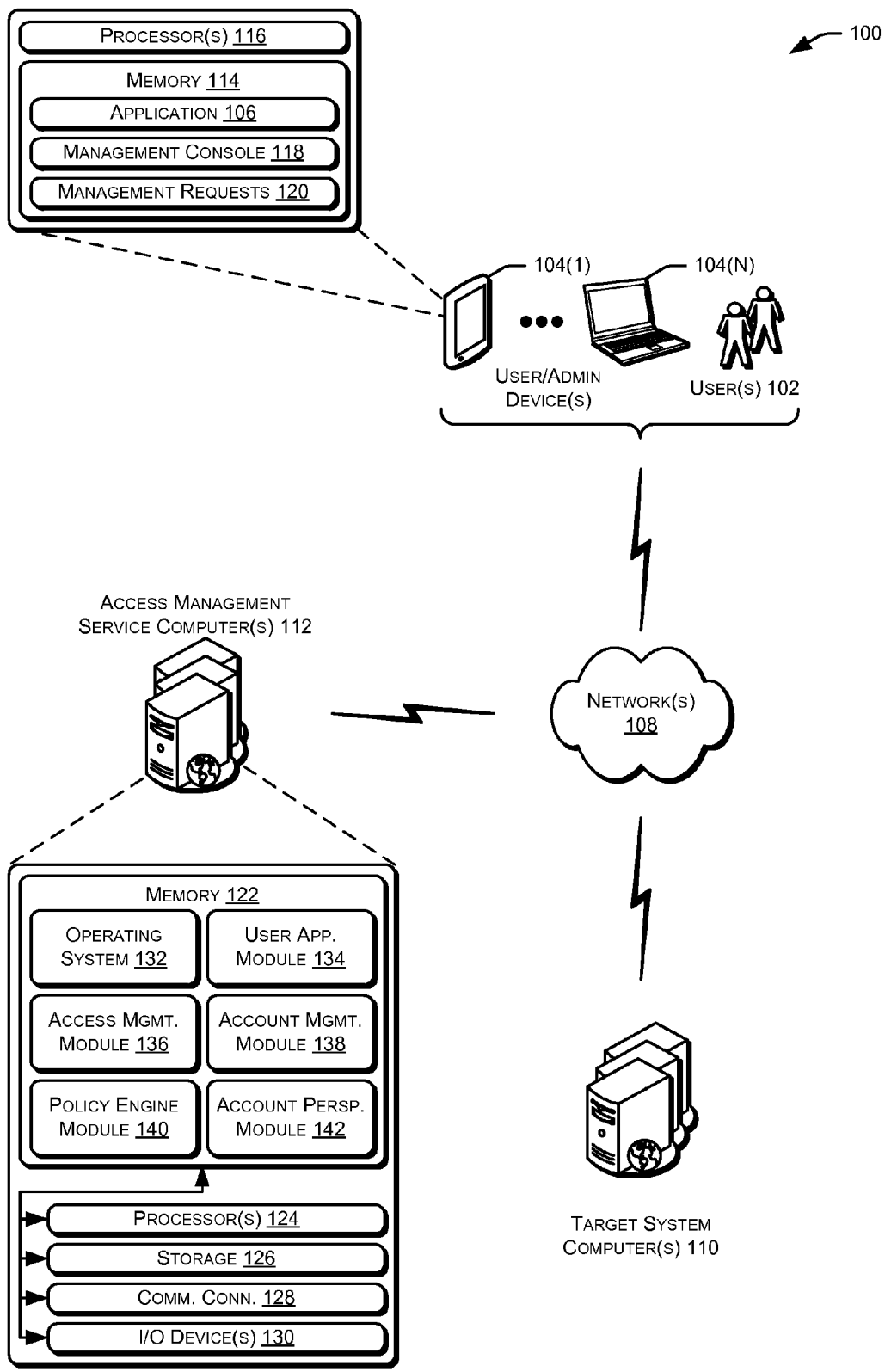
FIG. 1 is a simplified block diagram illustrating an example architecture for managing privileged accounts that includes one or more access management service computers, one or more user and/or administrator devices, and one or more target systems, connected via one or more networks, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing privileged account management services to one or more entities (e.g., target systems, users of target systems, administrators of target systems, and/or enterprise solutions) via a computing resource and/or computing system. As used herein, a target system may include, but is not limited to, a computer software product, a mobile application, a web application, a web server, a cloud-based application, or any other service that may be provided and/or administered by a computing device to access computing resources via one or more accounts. For example, an enterprise solution of a business may provide remote or other access to protected resources (e.g., networked files, directory information, or the like) of the business. As such, separate accounts may be implemented (e.g., user accounts, administrative accounts, and/or application accounts) for accessing or otherwise logging in to the enterprise solution. In this example, the enterprise solution hosted at a server or other computing system of the business may be the target system. The target system may include one or more databases, lightweight directory access protocol (LDAP) servers, UNIX systems or the like. Further, special accounts (e.g., a security account and/or an application account) may be implemented to aid in facilitating the privileged account management. As used herein, a privileged account may include one that relies on a password to receive access to the target system.

In some aspects, an account management service may be provided, via one or more account management service computers in communication with a target system. The account management service computers may provide the ability for users, administrators, and/or application accounts of the target system to manage credentials, grants, roles, types, and/or visualization of one or more accounts of the target system. In one example, the account management service may provide access management and security by managing log-in credentials for the one or more accounts of the target system. When a user or an administrator wishes to access the target system, the account management service may check out an appropriate password to the user. The user may then utilize the checked out password to log in to the target system. While checked out, the access management service may log or otherwise record interaction with the target system. In this way, malicious and/or other behavior may be properly attributed to the user and/or administrator that has the password checked out. In some examples, when the password is checked back in, a security account of the account management service (in some examples, a super root account) may log in to the target system and modify the password. Thus, subsequent requests to check out the password may receive a different password (i.e., the modified password).

In some examples, the security account (i.e., the super root) may not be accessible by a user or an administrator. This security account may be a special account that only provides target system access to the account management service. In this way, a user who has checked out a password will not be able to hijack the current password (change the password without notifying others) and/or act maliciously without being identified. This is because the security account may always have root access to the account credential information and will be able to log in even if the password were modified by a user previously logged in. Additionally, by modifying the password after each checked out password is checked back in, the account management service may ensure that users and/or administrators are unable to log in after the password has been checked back in (e.g., by remembering or otherwise keeping the password). Further, by logging actions taken with the target system and information associated with which users have the password checked out, and when, the account management service may be able to identify what actions were taken by which users.

In other aspects, the account management service may provide application account management and security by managing log-in credentials for an application account of the target system. As used herein, an application account may include an account that is not accessible by a user or administrator of the target system but, rather, is provided to the account management service computers and/or user devices to log in to the target system. That is, the account management service and/or a remote application may utilize the application account to automatically log in to the target system to enable access to other accounts. In this way, the application account may log in a client device prior to the user of the client device providing user credentials. In other words, the application account may register, identify, or otherwise authenticate a remote device, application, and/or service.

In some examples, the application account manager may receive registration information associated with one or more accounts (including an application account) of the target systems, mapping information associated with an application wallet (e.g., a credential wallet of a mobile device, of another device, or of an application), and/or password policies associated with the application account and/or other accounts (e.g., user accounts and/or administrator accounts). As such, when a password policy changes, the application account manager may update the application account password with the target system and in the application wallet. In this way, the application may be able to identify itself and/or authenticate itself with the target system even when the password policy is updated.

In other aspects, the account management service may provide perspective management and/or dynamic password policy management by providing free-form account tagging and/or role-based account grouping, respectively. For example, a perspective management service may allow administrators to provide free-form and/or user-defined tags (i.e., an attribute/value pair) for describing accounts. In one non-limiting example, an administrator may add accounts of the target system to be managed by the perspective management service. Once added, the administrator may tag accounts based on geographic regions (e.g., continent, country, city, etc.), functionality (e.g., support, human resources, development, legal, etc.), or the like. The fact that the tags may be user-defined in a free-form manner suggests that the administrator may freely identify other types or categories that they feel may aid in the organization and/or visualization of the accounts. Once the tags (i.e., the attributes) are identified or otherwise set, the administrator and/or a user may provide the appropriate values for each account. A user may then create a perspective for viewing the accounts based on the tags. For example, one non-limiting perspective may display or otherwise organize accounts located in a specified country at a highest level, followed by accounts of a particular function, followed by some other user-defined category or attribute.

In some examples, a dynamic password policy management service may allow administrators to group one or more accounts together based at least in part on user-/administrator-defined roles. For example, roles may include, but are not limited to, user accounts, administrator accounts, root accounts, or the like. Once the role based groups are identified, access grants may be set, determined, or otherwise managed. As such, when a new account is created by the target system, to be managed by the account management service, the role of the new account may identify an appropriate group in which it should be included. If the account is placed in that group, access grants may then be dynamically inherited by the new account based on it being in added to the group. Additionally, if access grants are changed for a particular group, each account managed by the group may be dynamically updated, with the new access grant, without necessitating manual updating of each account's grant policy.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts a simplified example system or architecture 100 in which techniques for providing a privileged account management service may be implemented. In architecture 100, one or more users and/or administrators 102 (i.e., account holders) may utilize user computing devices 104(1)-(N) (collectively, user devices 104) to access an application (e.g., a web service application or the like) 106, or a user account accessible through the application 106, via one or more networks 108. In some aspects, the application 106 and/or user account may be hosted, managed, and/or provided by a computing resources service or service provider, such as by utilizing one or more target system computers 110. The one or more target system computers 110 may, in some examples, provide computing resources and/or services such as, but not limited, web services, data storage, email, identity management, authorization, authentication services, or the like. The one or more target system computers 110 may also be operable to provide web hosting, application development platforms, implementation platforms, or the like to the one or more users 102.

The one or more target system computers 110 may also deploy or otherwise utilize one or more proprietary or third-party identity services, access management services, or other services. In some examples, an account management service implemented by one or more account management service computers 112 may act as a management layer for interacting with the target system computers 110 and/or its third-party service providers. As such, in some cases, the user devices 104, the target system computers 110 and/or the account management service computers 112 may each be accessible by one another via the one or more networks 108.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the application 106 over the networks 108, the described techniques may equally apply in instances where the users 102 interact with a target system computer 110 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The application 106 may allow the users 102 to interact with the target system computers 110, such as to store, access, and/or manage data, develop and/or deploy computer applications, and/or host web content. The one or more target system computers 110, perhaps arranged in a cluster of servers or as a server farm, may provide access to the application 106 and/or host the application 106 (e.g., when the application 106 is a web service application). Other server architectures may also be used to provide access to the application 106 and/or to host the application 106. The application 106 may be capable of handling requests from many users 102 and serving, in response, various user interfaces that can be rendered at the user devices 104. The application 106 can be any type of application (e.g., a web browser or other interface) that supports user interaction, including enterprise solutions, email applications, social networking sites, online retailers, informational sites, blog sites, search engine sites, news and entertainment sites, and so forth. Additionally, the described techniques can be similarly implemented outside of the application 106.

As noted above, the architecture 100 may include one or more user devices. The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the target system computers 110 via the networks 108, or via any other network connections. Further, the user devices 104 may also be configured to implement one or more applications (e.g., the application 106 and/or a mobile application). In one illustrative configuration, the user devices 104 may include at least one memory 114 and one or more processing units (or processor(s)) 116. The processor(s) 116 may be implemented as appropriate in hardware, computer-executable instructions, firmware, or combinations thereof. Computer-executable instructions or firmware implementations of the processor(s) 116 may include computer-executable or machine-executable instructions written in any suitable programming language to perform the various functions described.

The memory 114 may store program instructions that are loadable and executable on the processor(s) 116, as well as data generated during the execution of these programs. Depending on the configuration and type of user device 104, the memory 114 may be volatile (such as random access memory (RAM)) and/or non-volatile (such as read-only memory (ROM), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 114 may include multiple different types of memory, such as static random access memory (SRAM), dynamic random access memory (DRAM), or ROM.

Turning to the contents of the memory 114 in more detail, the memory 114 may include an operating system and one or more application programs or services for implementing the features disclosed herein including at least a management console 118, such as a Web browser or dedicated application (e.g., a smart phone application, a tablet application, etc.) and/or the application 106. The management console 118 may be configured to receive, store, and/or display a website or other interface for interacting with the account management service computers 112. Additionally, the memory 114 may store access credentials and/or other user information such as, but not limited to, user IDs, passwords, other user information, and/or resource management requests 120 to be sent to the target system computers 110 and/or account management service computers 112. In some examples, the other client information may include information for authenticating an account access request such as, but not limited to, a device ID, a cookie, an IP address, a location, or the like. In addition, the other client information may include a user 102 provided response to a security question or a geographic location obtained by the user device 104. Further, the service requests 120 may include requests to update and/or manage identities, requests to access one or more service providers, requests to authenticate or authorize the user 102, requests to tag accounts, requests to group accounts, requests to set access grants, requests to register accounts with the account management service computers 112, etc.

Additionally, in some aspects, the management console 118 may allow a user 102 to interact directly with the account management service computers 112. For example, the user devices 104 may make access, service, and/or identity management requests to the account management service computers 112 via the advice console 118. In some examples, the requests sent to the account management service computers 112 may be formatted as REST calls, implemented using WebServices, and/or implemented via remote method invocation (RMI). When using RESTful interfaces, the REST calls may be predefined and/or exposed by the account management service computers 112. Also utilizing the management console 118, in some examples, a user may make requests for accessing the target system computers. In some cases, these requests may be received by the account management service computers 112, as REST calls, WebServices calls, and/or RMI invocations. The received requests may then be translated or otherwise utilized to generate or otherwise retrieve one or more passwords, password policies, security logs, perspectives and/or visualizations, role-based group information, combinations of the foregoing, or the like.

In some aspects, the account management service computers 112 may also be any type of computing devices such as, but not limited to, mobile, desktop, thin-client, and/or cloud computing devices, such as servers. In some examples, the account management service computers 112 may be in communication with the user devices 104 via the networks 108, or via other network connections. The account management service computers 112 may include one or more servers, perhaps arranged in a cluster, as a server farm, or as individual servers not associated with one another. These servers may be configured to host features described herein including, but not limited to, the account management service. Additionally, in some aspects, the account management service computers 112 may be configured as part of an integrated, distributed computing environment.

In one illustrative configuration, the account management service computers 112 may include at least one memory 122 and one or more processing units (or processor(s)) 124. The processor(s) 124 may be implemented as appropriate in hardware, computer-executable instructions, firmware, or combinations thereof. Computer-executable instruction or firmware implementations of the processor(s) 124 may include computer-executable or machine-executable instructions written in any suitable programming language to perform the various functions described.

The memory 122 may store program instructions that are loadable and executable on the processor(s) 124, as well as data generated during the execution of these programs. Depending on the configuration and type of account management service computers 112, the memory 122 may be volatile (such as random access memory (RAM)) and/or non-volatile (such as read-only memory (ROM), flash memory, etc.). The account management service computers 112 or servers may also include additional storage 126, which may include removable storage and/or non-removable storage. The additional storage 126 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 122 may include multiple different types of memory, such as static random access memory (SRAM), dynamic random access memory (DRAM), or ROM.

The memory 122, the additional storage 126, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 122 and the additional storage 126 are all examples of computer storage media.

The account management service computers 112 may also contain communications connection(s) 128 that allow the target system computers 110 to communicate with a stored database, another computing device or server, user terminals, and/or other devices on the networks 108. The account management service computers 112 may also include input/output (I/O) device(s) 130, such as a keyboard, a mouse, a pen, a voice input device, a touch input device, a display, speakers, a printer, etc.

Turning to the contents of the memory 122 in more detail, the memory 122 may include an operating system 132 and one or more application programs or services for implementing the features disclosed herein including a user application module 134, an access management module 136, an account management module 138, a policy engine module 140, and/or an account perspective module 142. The user application module 134 may be configured to generate, host, or otherwise provide the management console 118, and/or a website for accessing the management console 118.

In some examples, the access management module 136 may be configured to implement the access management services briefly described above. For example, the account management module 136 may provide check-out, check-in, security logging, security accounts, and/or automatic password modification services for accounts associated with the target system computers 110. In this way, in some examples, account passwords may be changed after each use, and the target system computers 110 and/or administrator devices 104 may be able to monitor what users are logged in to the target system computers 110 at what times. While it may be possible for multiple users to check out a password (in some examples, the same password) at the same time, the account management module 136 may make it possible to keep users from hijacking the password or otherwise acting maliciously on the target system computers 110 without going unnoticed.

In some aspects, the account management module 138 may be configured to implement the application account management services briefly described above. For example, the account management module 138 may provide password lifecycle, automatic password updating (e.g., based at least in part on password policy changes), application wallet mapping, and/or password policy management services for accounts associated with the target system computers 110. In this way, in some examples, password policies may be updated and/or changed without eliminating application account access to the target system computers 110. That is, an application wallet that maintains an application account password may be automatically updated by the account management module 138 based at least in part on a password policy change. As noted above, an application account may be an account that is not and/or cannot be accessed by a user and may be utilized by an application (e.g., the application 106 of the device 104) to access to the target system computers 110.

In some aspects, the policy engine module 140 may be configured to implement the role-based, access grant policy update services briefly described above. For example, the policy engine module 140 may provide account registration, account role assignment (i.e., the ability to assign roles and/or types to accounts), account grouping (in some examples, based at least in part on the roles), and/or automatic access grant updating. In this way, accounts may be assigned to groups and, in some examples, access grants may be updated for each account in the group based at least in part on change in policy. Additionally, in some examples, a new account may be added to a group and have grants automatically assigned thereto based at least in part on the grants already assigned to the group.

In some aspects, the account perspective module 142 may be configured to implement the user-defined perspective and/or hierarchical viewing services described briefly above. For example, the account perspective module 142 may provide the ability to tag or otherwise assign attribute/value pairs to describe accounts. Based at least in part on the assigned tags, users and/or administrators may be able to view user-defined views of the managed accounts based at least in part user-selected perspectives.

Additional types of computer storage media (which may also be non-transitory) that may be present in the account management service computers 112 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the account management service computers 112. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
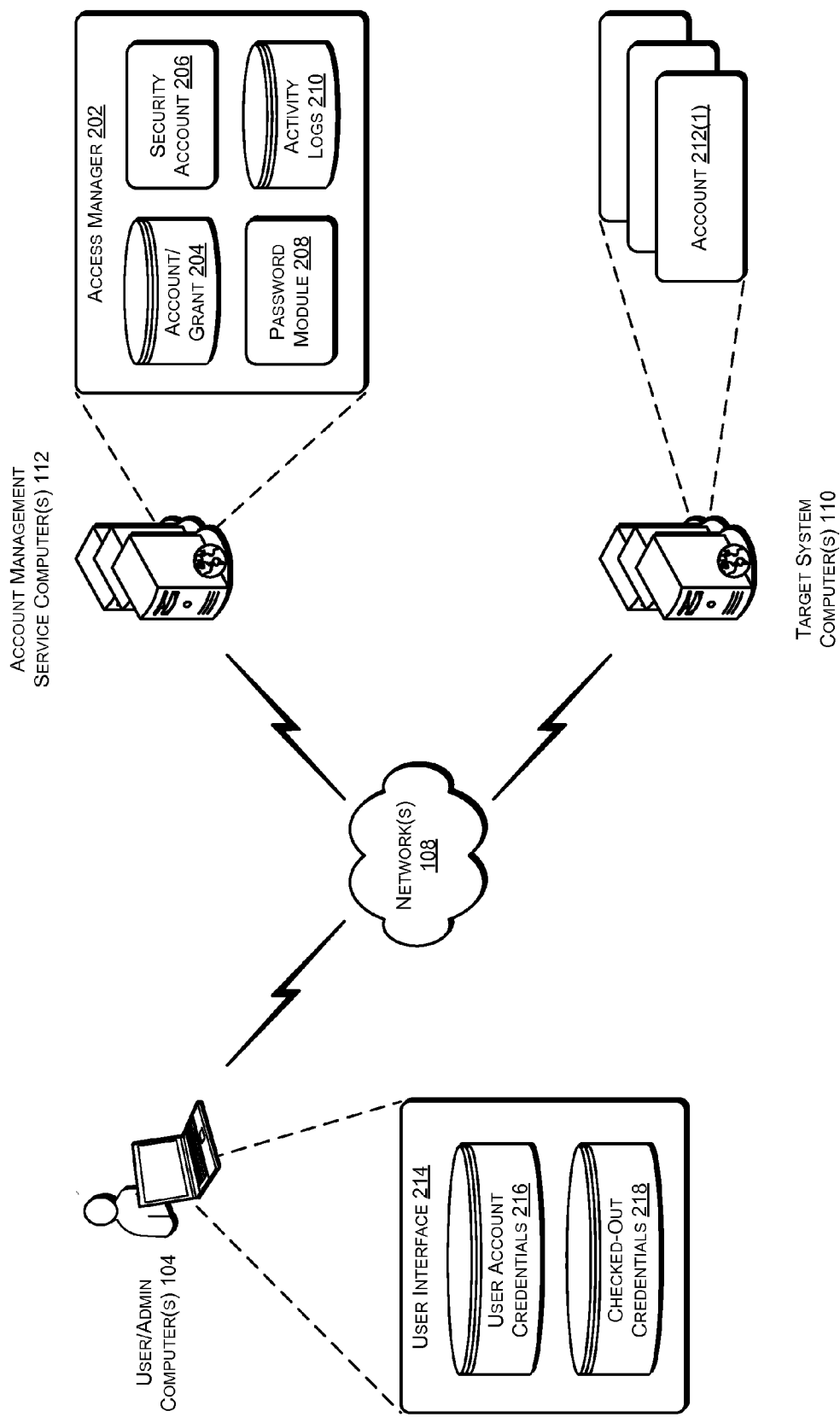
FIG. 2 is a simplified block diagram illustrating at least some features of an access management system implemented by one or more access management service computers described herein, according to at least one example.

As noted, in at least one example, one or more aspects of the environment or architecture 100 may incorporate and/or be incorporated into a distributed program execution service such as that hosted by the account management service computers 112. FIG. 2 depicts a simplified architecture 200 illustrating additional aspects and/or features of the account management service computers 112 of FIG. 1. For example, FIG. 2 illustrates an access manager 202, such as that implemented by the access management module 136 of FIG. 1, configured to store account/grant data 204, a security account 206, a password module 208, and/or activity logs 210. Similar to that described with reference to FIG. 1, the account management service computers 112 may be in communication with one or more target system computers 110, and/or user/administrator computers 104 via the one or more networks 108. Additionally, as described above, the one or more target system computers 110 may include one or more accounts 212(1)-(N), collectively accounts 212. While the user/administrator computers 104 are shown here as a laptop computer, any computing device accessible to a user or an administrator of an account or application may be utilized. Further, as described above, the user/administrator computers 104 may include a user interface 214 for receiving instructions and/or providing feedback to the user and/or administrator. The user interface 214 may also be stored in a memory configured to store user account credentials 216 and/or checked-out credentials 218.

In one non-limiting example, a user (or an administrator) of an account 212 associated with a target system computer 110 may provide user credentials 216 for accessing the account management service computers 112. In this example, it is assumed that the accounts 212 have already been brought under the management of the account management service (i.e., the accounts 212 have been registered with the access manager 202 and/or appropriate account information 204 has been stored therein). Upon authenticating the user and checking the grant data 204 (e.g., to determine whether the user has been granted rights to access the account), the access manager 202 may provide, from the password module 208, a password for logging into the account 212. In some examples, the fact that the password has been checked out to the user may be logged in the activity log 210. Additionally, the user computer 104 may now store the password in the checked-out credentials data store 218. The user may now log into the account 212. Any, some, or all activity associated with the user computer 104 and the account 212 may also be logged in the activity logs 210 while the password is checked out to the user.

In some aspects, when the user is finished accessing the account 212, the user may check the password back in with the access manager 202. This action may also be logged in the activity logs 210. Upon checking the password back in, the access manager 202 may automatically invoke the password module 208. The password module 208 may be responsible for implementing the security account 206 to log into the account 212 for modifying the password. Since the security account 206 always has password modification grants, and is not accessible by the user or user computers 104, the password may be modified in such a way that the user may no longer be able to use the password stored in the checked-out credentials data store 218. This may aid in ensuring that the user is not able to access the account 212 without first checking out a password, as the password will be changed by the security account 206. In some cases, only the password module 208 may be able to access the security account 206. Additionally, in some aspects, the password module 208 may be configured to randomly generate each new password upon each instance of a user checking in a password.

Figure 3:
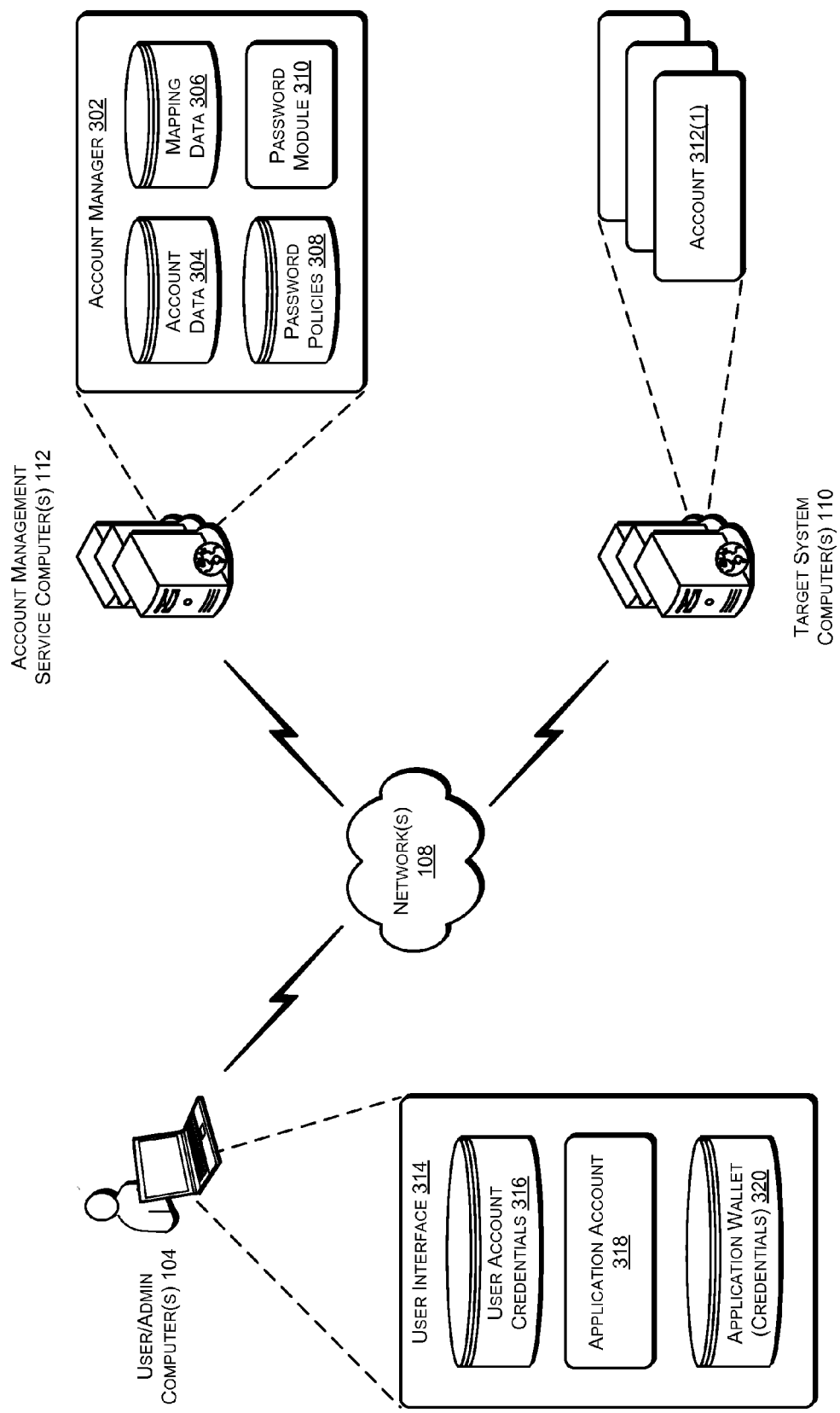
FIG. 3 is a simplified block diagram illustrating at least some features of an application account management system implemented by one or more access management service computers described herein, according to at least one example.

FIG. 3 depicts a simplified architecture 300 illustrating additional aspects and/or features of the account management service computers 112 of FIG. 1. For example, FIG. 3 illustrates an account manager 302, such as that implemented by the account management module 138 of FIG. 1, configured to store account data 304, mapping data 306, password policies 308, and/or a password module 310. Similar to that described with reference to FIGS. 1 and 2, the account management service computers 112 may be in communication with one or more target system computers 110, and/or user/administrator computers 104 via the one or more networks 108. Additionally, as described above, the one or more target system computers 110 may include one or more accounts 312(1)-(N), collectively accounts 312. Similarly, while the user/administrator computers 104 are shown here as a laptop computer, any computing device accessible to a user or an administrator of an account or application may be utilized. Further, as described above, the user/administrator computers 104 may include a user interface 314 for receiving instructions and/or providing feedback to the user and/or administrator. The user interface 314 may also be stored in a memory configured to store user account credentials 316, an application account 318, and/or an application wallet 320 for storing application account credentials.

In at least one non-limiting example, an administrator (or user) may register the one or more accounts 312 associated with the target system computers 110 with the account manager 302. As such, the account data 304 may include information associated with registered accounts such as, but not limited to, account identifiers, account credentials, authorized users/administrators, access grant information, and/or information indicating with which target system the account 312 is associated. In some examples, once registered, the administrator may also set password policies 308 by entering one or more policies (e.g., construction requirements, life-cycle requirements, etc.) via the user interface 314. The administrator may also provide mapping data 306 via the interface 314. The mapping data 306, in some examples, will identify a location of the application wallet 320 in such a way that the account manager 302 will be able to access, receive information from, and/or provide information to the application wallet 320. For example, the mapping data 306 may include a uniform resource locator (URL) or other location information. In this case, the user account credentials 316 may include administrator account credentials for logging into the account manager 302 in order to register the accounts 312, provide the password policies 308, and/or provide the mapping data 306. However, in other examples, the user account credentials 316 may include credentials for logging the user and/or administrator into the accounts 312 (e.g., once they have been registered and/or mapped).

In some aspects, and as noted above, the account manager 302 may also be configured with a password module 310. The password module 310 may be configured to log into the accounts 312 of the target system computers 110 on behalf of the account manager 302. For example, when a password policy changes (e.g., based at least in part on input from an administrator, based at least in part on a lifecycle policy, and/or based at least in part on a change in account data 304) the password module 310 may be configured to log into the target system 110, update the application account password (e.g., to match a new policy) with the target system 110, and update the application account password in the application wallet 320. In this way, the application account 318 may always have the correct application account password stored with application wallet 320 for logging into the target system computers 110, regardless of changes made to the password policy. As noted above, in some examples, the application account 318 may be configured to logging an application of the user/administrator computers 104 into the target system computers 110 (e.g., the application 106 of Figure) and may not be accessible to a user or an administrator.

Figure 4:
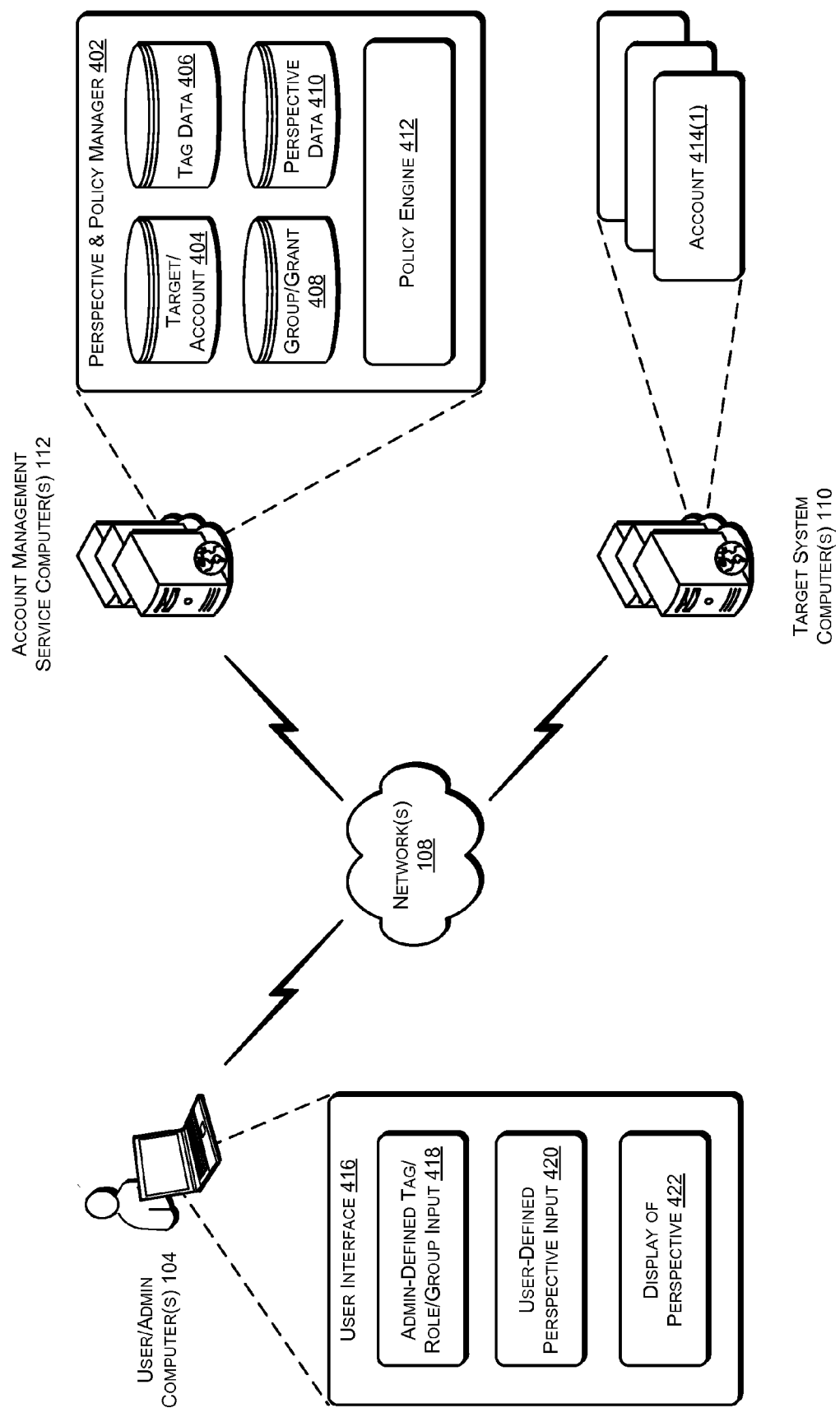
FIG. 4 is a simplified block diagram illustrating at least some features of a managed account perspective system and/or a dynamic policy engine implemented by one or more access management service computers described herein, according to at least one example.

FIG. 4 depicts a simplified architecture 400 illustrating additional aspects and/or features of the account management service computers 112 of FIG. 1. For example, FIG. 4 illustrates a perspective and policy manager 402, such as that implemented by the policy engine module 140 and/or account perspective module 142 of FIG. 1, configured to store target/account data 404, tag data 406, group/grant data 408, perspective data 410, and/or a policy engine 412. Similar to that described with reference to FIGS. 1-3, the account management service computers 112 may be in communication with one or more target system computers 110, and/or user/administrator computers 104 via the one or more networks 108. Additionally, as described above, the one or more target system computers 110 may include one or more accounts 414 (1)-(N), collectively accounts 414. Further, as described above, the user/administrator computers 104 may include a user interface 416 for receiving instructions and/or providing feedback to the user and/or administrator. The user interface 316 may also be stored in a memory and configured to receive administrator-defined tag/role/group input 418, receive user-defined perspective input 420, and/or display perspectives 422 to users and/or administrators.

In at least one non-limiting example, the perspective and policy manager 402 may be configured to receive, from an administrator logged in via the user/administrator computer 104, one or more accounts 414 to be managed by the account management service computers 112. As noted above, management of these accounts 414 may include checking out passwords to users for accessing the accounts of the target system computers 110 and/or updating passwords of application accounts. Additionally, in some examples, the management may include providing methods for effectively organizing and/or visualizing the accounts 414 for display on a computing system such as, but not limited to, the one or more user/administrator computers 104. For example, the perspective and policy manager 402 may store the registered account information in the target/account data store 404. The registered account information may include, but is not limited to, account identification information, account log-in credentials, and/or associated target system computer 110 information.

In some examples, administrators and/or users may provide free-form tags to describe or otherwise annotate the accounts 414. For example, using the user interface 416, an administrator may provide an admin-defined tag at input 418. Such tag information may be stored in the tag data store 406 of the account management service computers 112. Admin- and/or user-defined tags may, in some examples, include attribute/value pairs such as, but not limited to, "continent/Asia," "country/UK," "function/legal," or the like. Alternatively, the admin-defined tags may include just the attribute, while another administrator or a user may later include the appropriate value. Further, in some examples, administrators and/or users may be able to provide free-form tags and/or attribute/value pairs that are not standard tags. For example, a previously unknown type of tag (e.g., native language, group leader, hair color, etc.) may be used that appropriately fits a type of account being used in a particular situation.

Additionally, in some examples, once tags are assigned to the registered accounts (i.e., accounts that are being managed by the account management service computers 112), users of the target system computers 110 may be able to select and/or define viewing perspectives (e.g., previously stored or newly added to the perspective data store 410). In some cases, the possible viewing perspectives 410 may be based at least in part on the pre-set tags. However, in other examples, users may be able to define new perspectives and/or add new tags as appropriate. As noted, the perspectives may be stored in the perspective data store 410. Once a perspective is selected and/or defined, the perspective and policy manager 402 may generate or otherwise prepare a view to display to the user via the display of perspective module 422 of the device 104. The user may then further narrow and/or change the view based at least in part on the prepared and/or rendered perspective. Thus, the multiple different accounts 414, in some examples part of multiple different target systems and/or different target system computers 110, may be organized, visualized, and/or displayed in user-defined (e.g., hierarchical) ways.

In at least one other non-limiting example, the perspective and policy manager 402 may be configured to implement the policy engine 412 to dynamically manage access grant policies of one or more accounts 414. For example, the policy engine 412 may be configured to maintain grants associated with each account 414 or it may be configured to maintain grants associated with groups of accounts. In some examples, a grant indicates one or more permissions provided to a user, an administrator, an account, and/or a group of accounts. Further, accounts 414 may be assigned roles including, but not limited to, user, administrator, root, etc. These roles may be used, in some cases, to identify a type of account 414 and/or a group of accounts 414.

In some examples, an administrator may provide, via the role input 418, one or more roles for each or some of the accounts 414 registered to be managed by the account management service computers 112. In this way, each account may be assigned a role. Additionally, using the role input 418, administrators may also assign grants to particular users. This grant information may be stored, in some examples, in the group/grant data store 408. Further, in some cases, accounts

414 may be organized in groups by the perspective and policy manager 402 (e.g., based at least in part on receiving group information via the group input 418), also to be stored in the group/grant data store 408. Accounts may be dynamically added or removed from groups as well as grants may be added or removed to users. However, in some examples, once groups have been formed by the perspective and policy manager 402, one or more grants may be assigned to the group.

In some cases, new accounts 414 may be added to the account management service, to be managed by the account management service computers 112. If the new account 414 has a role that matches a group role, the account 414 may be automatically added to the group with the matching role. In this case, the grant of the group may be automatically inherited by the newly added account 414. Alternatively, if an account 414 is removed from a group, the grant that was assigned to that group may be removed from the account 414 being removed. Further, in some cases, when a grant policy changes for a particular role, the policy engine 412 may automatically update the grants for the group and/or for each account 414 of the group. However, updating the grant for each account 414 may facilitated by updating the grant for the group, rather than updating each account individually.

Further, the example architectures, tools, and computing devices shown in FIGS. 1-4 are provided by way of example only. Numerous other operating environments, system architectures, and device configurations are possible. Accordingly, embodiments of the present disclosure should not be construed as being limited to any particular operating environment, system architecture, or device configuration.

Illustrative Processes

FIGS. 5-8 illustrate simplified example flow diagrams showing respective processes 500, 600, 700, and 800 for providing privileged account management services. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 5:
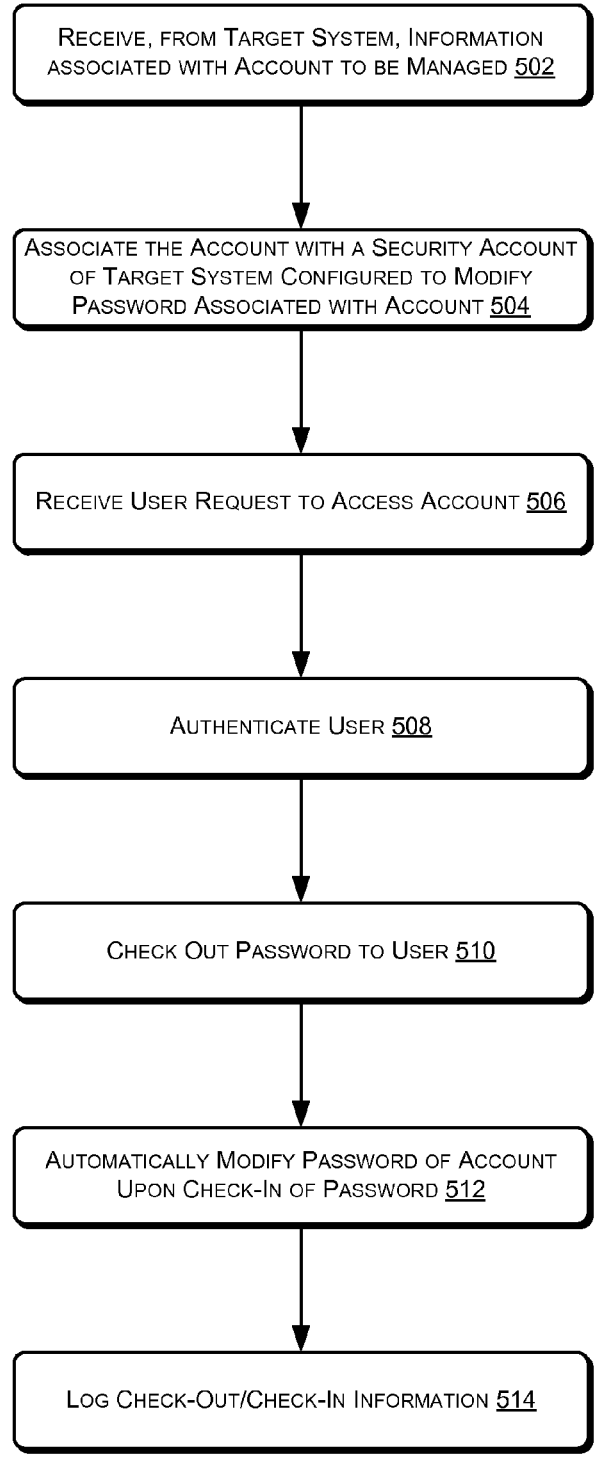
FIGS. 5-8 are simplified flow diagrams illustrating example processes for implementing at least some features of the privileged account management described herein, according to at least a few examples.

In some aspects, the process 500 of FIG. 5 may be performed by the one or more account management service computers 112 shown in FIG. 1. In particular, some or all of the process 500 of FIG. 5 may be performed by the access management module 136 of FIG. 1 and/or the access manager 202 of FIG. 2. The process 500 may begin by receiving, from a target system, information associated with an account to be managed at 502. As noted above, the information may include, but is not limited to, an identification of the account, users of the account, grants associated with the account and/or the user, associated target system information, or the like. At 504, the process 500 may associate the account with a security account of the target system configured to modify a password associated with the account. That is, a security account (e.g., a management account, super root, or the like) may have priority access and/or a grant that allows it to change account passwords in all instances. For example, the security account may be configured (or granted permission) to modify account passwords even if the password has been changed by another.

In some examples, the process 500 may then receive a request to access the account (e.g., from a user) at 506. The process 500, at 508, may authenticate the user (or administrator) that is requesting access to the account. At 510, the process 500 may check out an account password to the user (assuming the user has been authenticated and/or has been assigned appropriate grants/rights). As noted above, activity logs (including information associated with which user has the password checked out) may be stored and/or maintained to track usage of the account. At 512, the process 500 may automatically modify the password of the account upon receiving indication that the user has checked the password back in. The process 500 may then end at 514 by logging the remaining check-out/check-in information (e.g., that the user has checked the password back in).

Figure 6:
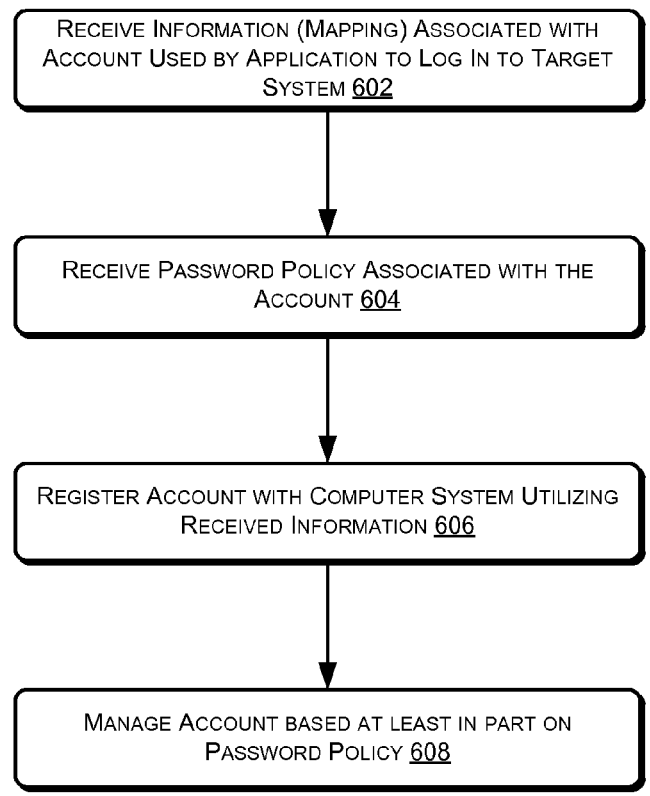

FIG. 6 illustrates a simplified example flow diagram showing the process 600 for providing features of a privileged account management service. In some aspects, the process 600 of FIG. 6 may be performed by the one or more account management service computers 112 shown in FIG. 1. In particular, some or all of the process 600 of FIG. 6 may be performed by the account management module 138 of FIG. 1 and/or the application account manager 302 of FIG. 3. The process 600 may begin by receiving information associated with an account used by an application (as opposed to a user) to log into a target system at 602. In some examples, the information may indicate account information (e.g., credentials, grants, etc.), associated target information (e.g., with which target system the account is associated), and/or mapping information (e.g., location information associated with an application wallet of the application). The process 600 may also receive a password policy associated with the account at 604. As noted above, the password policy may indicate construction rules, lifecycle rules, and/or other password policy rules. At 606, the process 600 may register the account with a computer system (e.g., the account management service computers 112) utilizing the received information. That is, the one or more accounts may be registered such that are under the management of the system 112. The process 600 may end at 608 by managing the account based at least in part on the password policy. For example, if the password policy changes, the process 600 may update the password information (to comply with the new policy) at the target system and/or in an application wallet that locally manages the application account password at the user and/or administrator device.

Figure 7:
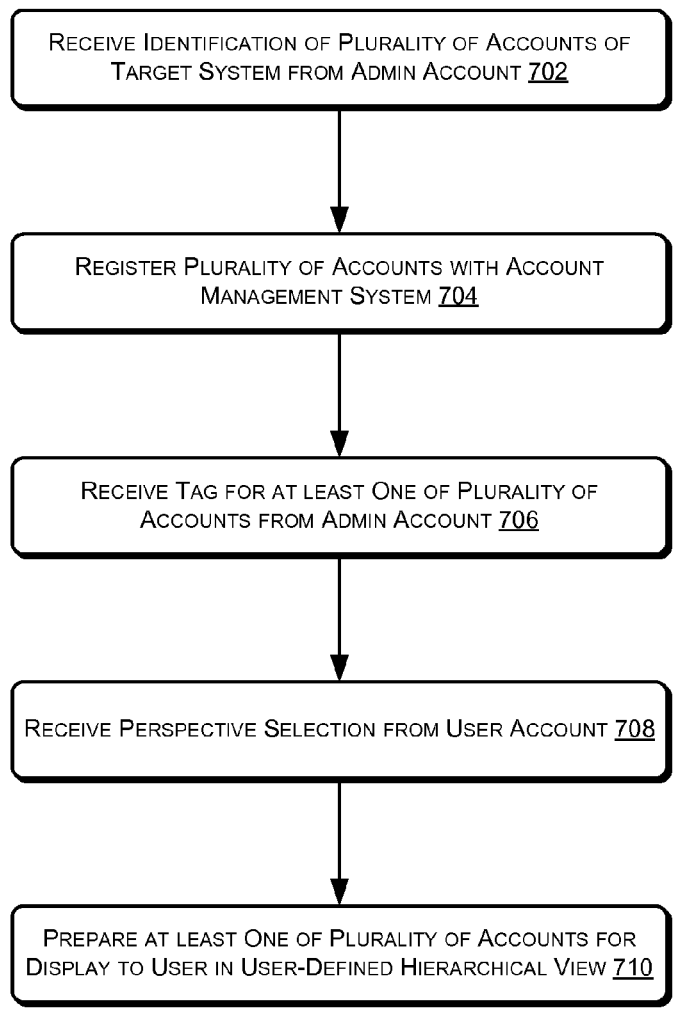

FIG. 7 illustrates a simplified example flow diagram showing the process 700 for providing features of a privileged account management service. In some aspects, the process 700 of FIG. 7 may be performed by the one or more account management service computers 112 shown in FIG. 1. In particular, some or all of the process 700 of FIG. 7 may be performed by the account perspective module 142 of FIG. 1 and/or the perspective and policy manager 402 of FIG. 4. The process 700 may begin by receiving identification of a plurality of accounts of a target system from an administrator account at 702. In some examples, the identification may include account information (e.g., credentials, grants, etc.) and/or associated target information (e.g., with which target system the account is associated). The process 700 may also register the plurality of accounts with the account management system implemented by, in some examples, the account management service computers 112, at 704. At 706, the process 700 may receive one or more tags (e.g., an attribute/value pair, an attribute, and/or a value) for at least one of the plurality of accounts. These tags may, in some cases, be received from an administrator of the account. At 708, the process 700 may receive, from a user and/or user account, a perspective selection. In some examples, the perspective selection may be based at least in part on one or more of the admin-defined tags. The process 700 may end at 710 by preparing at least one of the plurality of accounts for display to a user in a user-defined view. In some examples, the user-defined view may be based at least in part on the selected perspective and/or may be hierarchical.

Figure 8:
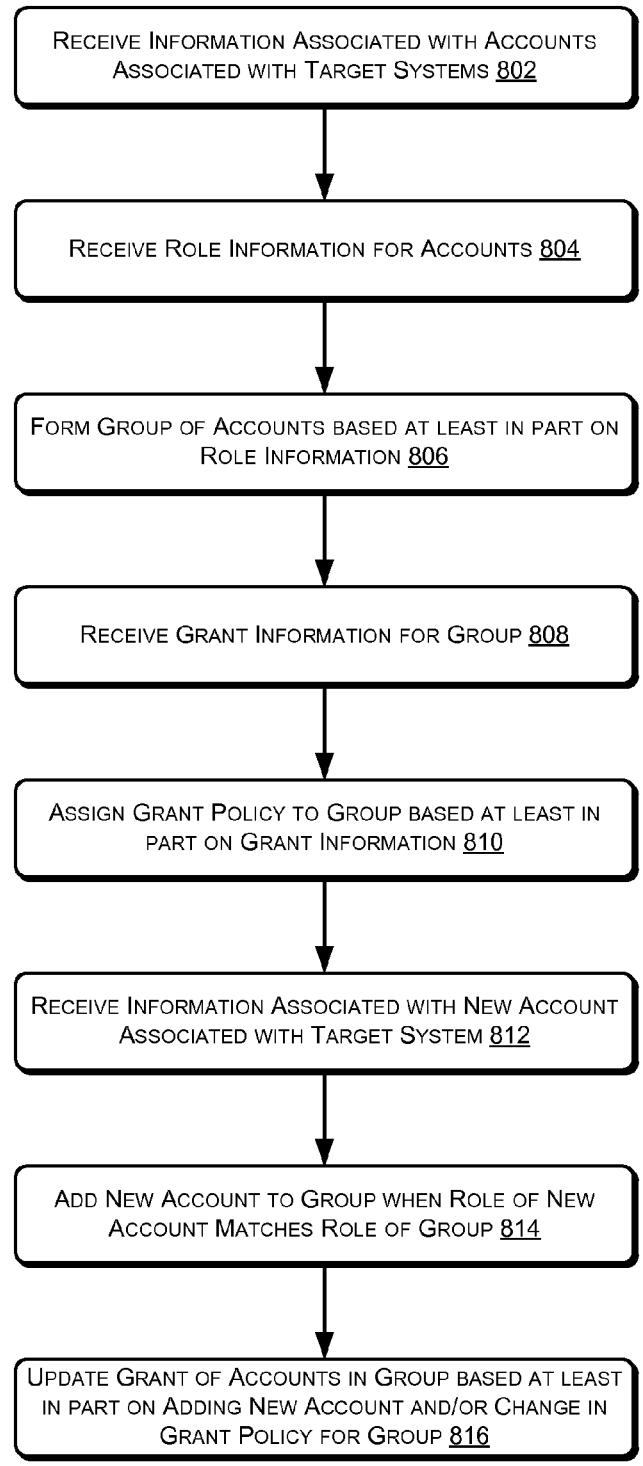

FIG. 8 illustrates a simplified example flow diagram showing the process 800 for providing features of a privileged account management service. In some aspects, the process 800 of FIG. 8 may be performed by the one or more account management service computers 112 shown in FIG. 1. In particular, some or all of the process 800 of FIG. 8 may be performed by the policy engine module 140 of FIG. 1 and/or the perspective and policy manager 402 of FIG. 4. The process 800 may begin by receiving information associated with one or more accounts associated with one or more target systems at 802. In some examples, the information may include account information (e.g., credentials, grants, etc.) and/or associated target information (e.g., with which target system the account is associated). Additionally, the process may receive information for a plurality of different accounts associated with a plurality of different target systems (e.g., each of different type, etc.). The process 800 may also receive role information for the accounts at 804. In some examples, the role information may be provided with the account information or it may be received from a user and/or administrator of the account. At 806, the process 800 may for one or more groups of accounts based at least in part on the role information. At 808, the process 800 may receive, from a user and/or user account, grant information for the group. In some instances, the grant information identifies access rights and/or privileges of users, accounts, and/or groups of user and/or accounts.

In some examples, the process 800 may assign a grant policy to a group based at least in part on the grant information at 810. The process 800, at 812, may receive information associated with a new account associated with the target system. In some cases, the new account may be recently registered with the management system and/or may be recently created by a user, administrator, and/or the target system. At 814, the process 800 may add the new account to a group when the role of the new account matches the role of a group. In other words, the new account may be automatically added to a group based at least in part on the role. If no group has a matching role, a new group may be formed with the new account. Subsequent new accounts of this role may then be added to the new group. The process 800 may end at 816 by updating the grants of each account in appropriate groups based at least in part on a newly added account and/or a change in the grant policy for a group. For example, if a grant policy changes for the role "user," then each account in a group associated with the "user" role may be updated.

Illustrative Systems

Figure 9:
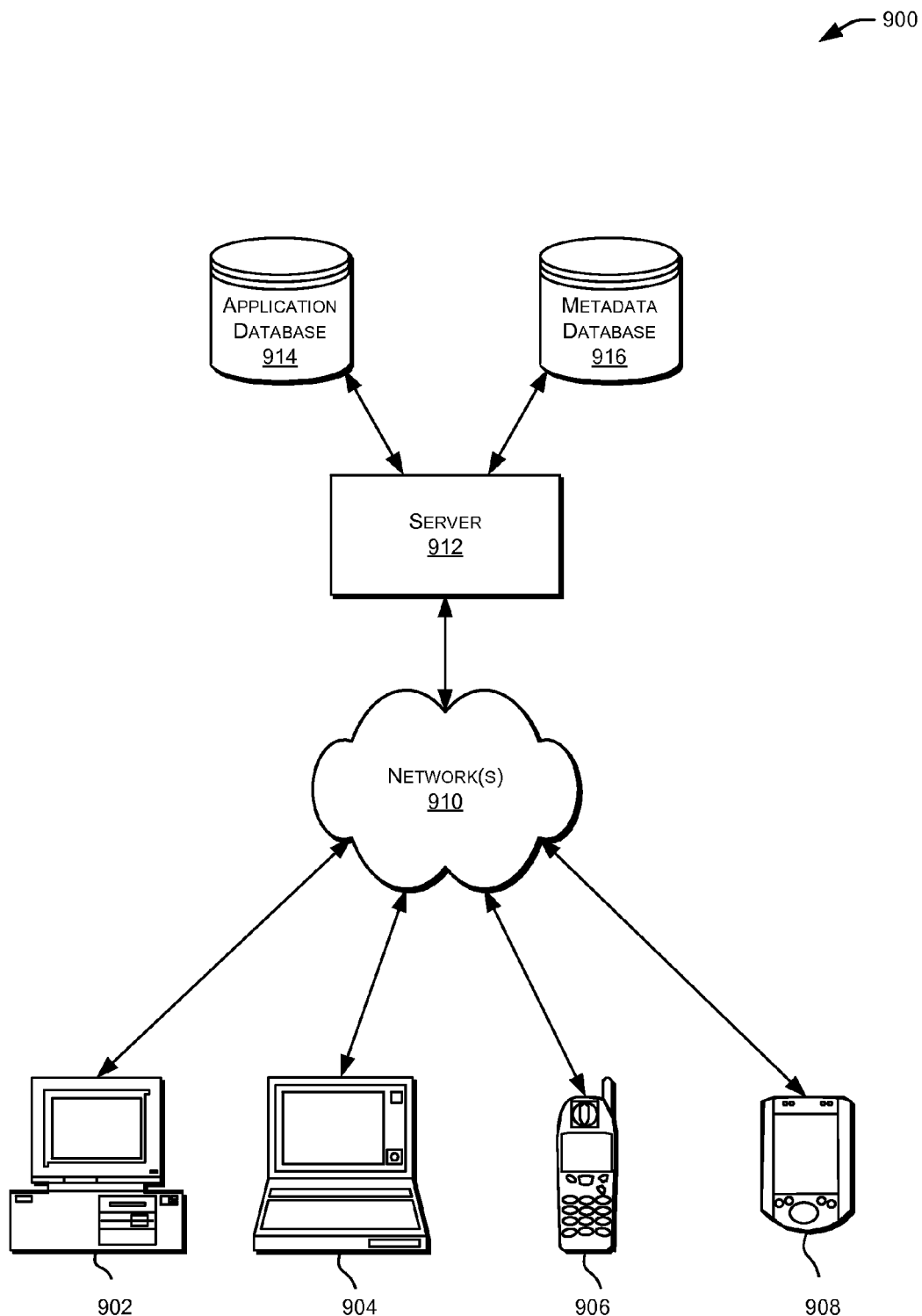
FIG. 9 is a simplified block diagram illustrating components of a system environment that may be used in accordance with an embodiment of the privileged account management described herein, according to at least one example.

FIG. 9 is a simplified block diagram illustrating components of a system environment 900 that may be used in accordance with an embodiment of the present disclosure. As shown, system environment 900 includes one or more client computing devices 902, 904, 906, 908, which are configured to operate a client application such as a web browser, proprietary client (e.g., Oracle Forms), or the like. In various embodiments, client computing devices 902, 904, 906, and 908 may interact with a server 912.

Client computing devices 902, 904, 906, 908 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 902, 904, 906, and 908 may be any other electronic device, such as a thin-client computer, Internet-enabled gaming system, and/or personal messaging device, capable of communicating over a network (e.g., network 910 described below). Although example system environment 900 is shown with four client computing devices, any number of client computing devices may be supported. Other devices such as devices with sensors, etc. may interact with server 912.

System environment 900 may include a network 910. Network 910 may be any type of network familiar to those skilled in the art that can support data communications using any of a variety of commercially-available protocols, including without limitation TCP/IP, SNA, IPX, AppleTalk, and the like. Merely by way of example, network 910 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 900 also includes one or more server computers 912 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP servers, FTP servers, CGI servers, Java servers, database servers, and the like. Example database servers include without limitation those commercially available from Oracle, Microsoft, Sybase, IBM and the like.

System environment 900 may also include one or more databases 914, 916. Databases 914, 916 may reside in a variety of locations. By way of example, one or more of databases 914, 916 may reside on a non-transitory storage medium local to (and/or resident in) server 912. Alternatively, databases 914, 916 may be remote from server 912, and in communication with server 912 via a network-based or dedicated connection. In one set of embodiments, databases 914, 916 may reside in a storage-area network (SAN) familiar to those skilled in the art. Similarly, any necessary files for performing the functions attributed to server 912 may be stored locally on server 912 and/or remotely, as appropriate. In one set of embodiments, databases 914, 916 may include relational databases, such as databases provided by Oracle, that are adapted to store, update, and retrieve data in response to SQL-formatted commands.

Figure 10:
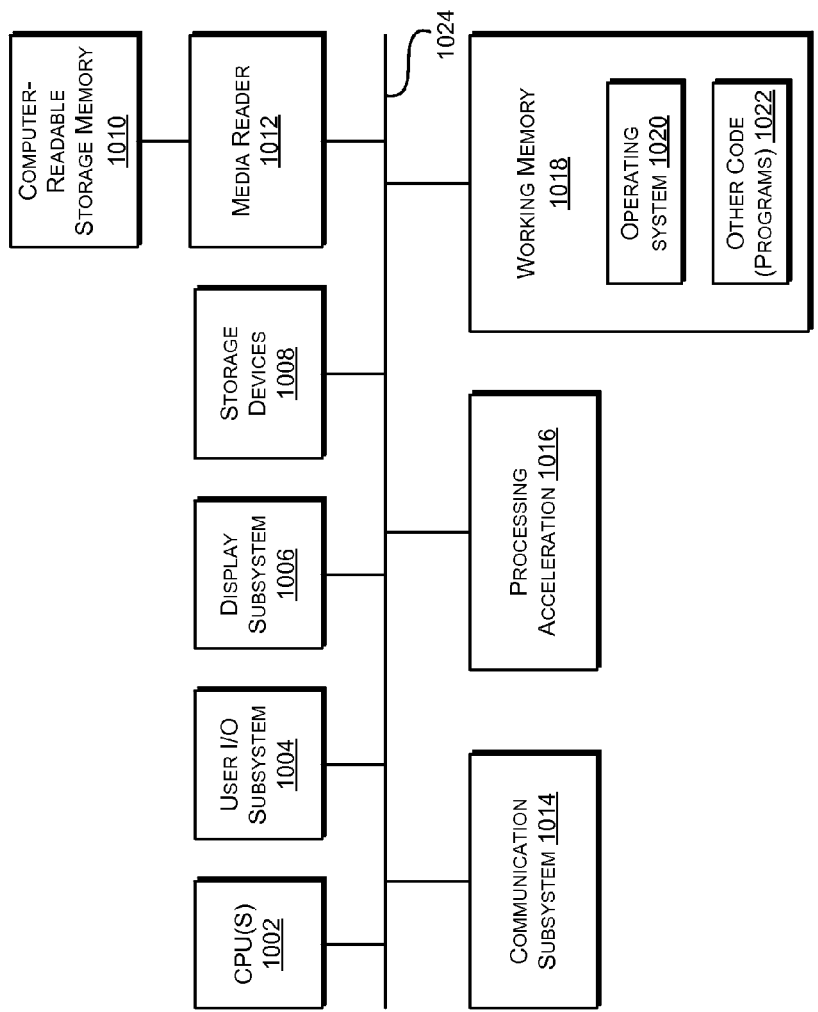
FIG. 10 is a simplified block diagram illustrating a computer system that may be used in accordance with embodiments of the privileged account management described herein, according to at least one example.

FIG. 10 is a simplified block diagram of a computer system 1000 that may be used in accordance with embodiments of the present disclosure. For example servers 114 and/or 1212 may be implemented using a system such as system 1000. Computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). Computer system 1000 may also include one or more storage devices 1008. By way of example, the storage device(s) 1008 may include devices such as disk drives, optical storage devices, and solid-state storage devices such as a random access memory (RAM) and/or a read-only memory (ROM), which can be programmable, flash-updateable and/or the like.

Computer system 1000 may additionally include a computer-readable storage media reader 1012, a communications subsystem 1014 (e.g., a modem, a network card (wireless or wired), an infra-red communication device, etc.), and working memory 1018, which may include RAM and ROM devices as described above. In some embodiments, computer system 1000 may also include a processing acceleration unit 1016, which can include a digital signal processor (DSP), a special-purpose processor, and/or the like.

Computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing computer-readable information. Communications system 1014 may permit data to be exchanged with network 1212 and/or any other computer described above with respect to system environment 1000.

Computer system 1000 may also comprise software elements, shown as being currently located within working memory 1018, including an operating system 1020 and/or other code 1022, such as an application program (which may be a client application, Web browser, mid-tier application, RDBMS, etc.). In an example embodiment, working memory 1018 may include executable code and associated data structures used for relying party and open authorization-related processing as described above. It should be appreciated that alternative embodiments of computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

Illustrative methods and systems for providing statistically triggered data placement are described above. Some or all of these systems and methods may, but need not, be implemented at least partially by architectures such as those shown in FIGS. 1-9 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:
1. A system, comprising:
 a memory storing a plurality of instructions; and
 one or more processors configured to access the memory, wherein the one or more processors are further configured to execute the plurality of instructions to:

receive a perspective selection for viewing multiple accounts based at least in part on tags assigned to registered accounts to display on a user device in a user-defined hierarchical view;

receive information that identifies a plurality of different types of accounts associated with a different type of target system external to the system that is managed by an account management service of the system, the plurality of accounts for accessing resources used by the associated target system;

receive a role of at least one of the plurality of accounts;

organize one or more of the plurality of accounts together in a group based at least in part on the role for each of the one or more of the plurality of accounts, the group being formed by the perspective selection and a policy manager;

assign a first grant to the group based at least in part on received grant information for the group, the grant information identifying access rights and privileges of users, accounts, groups of the users, or groups of the accounts;

identify a new account of the plurality of accounts that corresponds to the role, the new account being associated with at least a second grant that is different from the first grant;

add the new account to the group based at least in part on a request from an administrative account of the account management service; and update privileges of the group to include the second grant based at least in part on adding the new account to the group.

2. The system of claim 1, wherein a first account and a second account of the plurality of accounts each comprise a different type of account.

3. The system of claim 2, wherein the type comprises a user account, a root account, the administrative account, or a user-defined account.

4. The system of claim 1, wherein a first account and a second account of the plurality of accounts are associated with a first target system and a second target system, respectively.

5. The system of claim 4, wherein the first target system and the second target system each comprise a different type of target system.

6. The system of claim 1, wherein the information associated with the plurality of accounts indicates a particular target system associated with the account, a type of the account, or a role associated with the account.

7. The system of claim 1, wherein the one or more processors are further configured to execute the plurality of instructions to receive grant information for the group, wherein the assignment of the first grant to the group is based at least in part on the received grant information.

8. The system of claim 1, wherein the second grant is not previously associated with the group.

9. A computer-implemented method, comprising:

receiving, by a computer system, a perspective selection for viewing multiple accounts based at least in part on tags assigned to registered accounts to display on a user device in a user-defined hierarchical view;

receiving, by the computer system, information that identifies a plurality of different types of accounts associated with a plurality of different types of target systems, at least a first target system of the plurality of target systems being different from at least a second target system of the plurality of target systems;

receiving, by the computer system, role information for at least one of the plurality of accounts;

forming, by the computer system, a group of the plurality of accounts based at least in part on the role information, the group being formed by the perspective selection and a policy manager;

assigning, by the computer system, a first grant policy to the group of the plurality of accounts based at least in part on received grant information for the group, the grant information identifying access rights and privileges of users, accounts, groups of the users, or groups of the accounts;

identify a new account of the plurality of accounts that corresponds to the role information, the new account being associated with at least a second grant policy that is different from the first grant policy;

add the new account to the group based at least in part on a request from an administrator of the account management service; and update privileges of the group to include the second grant policy based at least in part on adding the new account to the group.

10. The computer-implemented method of claim 9, wherein the role information comprises identification of a role for the at least one of the plurality of accounts, the role comprising administrative, root, user, security, or user-defined.

11. The computer-implemented method of claim 9, wherein the role information is received from an administrative account of an account management service configured to manage the plurality of accounts associated with the plurality of target systems.

12. The computer-implemented method of claim 9, further comprising receiving grant information for the group, wherein the assigning of the first grant policy to the group is based at least in part on the received grant information.

13. A computer-readable memory storing a plurality of instructions executable by one or more processors, the plurality of instructions comprising:

instructions that cause the one or more processors to receive a perspective selection for viewing multiple accounts based at least in part on tags assigned to registered accounts to display on a user device in a user-defined hierarchical view;

instructions that cause the one or more processors to receive information that identifies a plurality of different types of accounts associated with a plurality of different types of target systems external to a system that is managed by an account management service of the system, at least a first target system of the plurality of target systems being different from at least a second target system of the plurality of target systems;

instructions that cause the one or more processors to receive, from an administrative account of the account management service configured to manage the plurality of accounts associated with the plurality of target systems, role information for at least one of the plurality of accounts;

instructions that cause the one or more processors to form a group of the plurality of accounts based at least in part on the role information, the group being formed by the perspective selection and a policy manager;

instructions that cause the one or more processors to assign a first grant policy to the group of the plurality of accounts based at least in part on received grant information for the group, the grant information identifying access rights and privileges of users, accounts, groups of the users, or groups of the accounts;

instructions that cause the one or more processors to identify a new account of the plurality of accounts that corresponds to the role information, the new account being associated with at least a second grant policy that is different from the first grant policy;

instructions that cause the one or more processors to add the new account to the group based at least in part on a request from an administrator of the account management service; and instructions that cause the one or more processors to update the first grant policy of each of the plurality of accounts in the group to the second grant policy based at least in part on adding the new account to the group.

14. The computer-readable memory of claim 13, wherein the plurality of accounts managed by the administrative account includes at least a first account that is a different type of account from at least a second account.

* * * * *